US011384734B1

(12) United States Patent
Birkestrand

(10) Patent No.: US 11,384,734 B1
(45) Date of Patent: Jul. 12, 2022

(54) WIND TURBINE

(71) Applicant: Orville J. Birkestrand, Davenport, IA (US)

(72) Inventor: Orville J. Birkestrand, Davenport, IA (US)

(73) Assignee: Orville J. Birkestrand, Davenport, IA (US)

( * ) Notice: Subject to any disclaimer, the term of this patent is extended or adjusted under 35 U.S.C. 154(b) by 436 days.

(21) Appl. No.: 15/482,313

(22) Filed: Apr. 7, 2017

(51) Int. Cl.
*F03D 9/28* (2016.01)
*F03D 7/02* (2006.01)
*F03D 1/06* (2006.01)

(52) U.S. Cl.
CPC .............. *F03D 9/28* (2016.05); *F03D 1/0633* (2013.01); *F03D 7/0276* (2013.01); *F05B 2220/706* (2013.01); *F05B 2240/2211* (2013.01); *F05B 2270/101* (2013.01); *F05B 2270/301* (2013.01)

(58) Field of Classification Search
CPC . F03D 7/0276; F03D 7/04; F03D 9/25; F03D 13/20; F03D 1/0641; F03D 1/0666; F03D 1/0675; F03D 7/00; F03D 7/02; F03D 7/0244; F03D 7/06; F03D 9/28; F03D 1/00; F05B 2270/101; F05B 2270/32; F05B 2270/327; Y02E 10/72; Y02E 10/74; Y02E 60/16; Y02E 10/728; Y02E 10/70
See application file for complete search history.

(56) References Cited

U.S. PATENT DOCUMENTS

| 4,108,403 | A | * | 8/1978 | Finch ..................... B64C 23/065 |
| | | | | 244/199.2 |
| 4,143,522 | A | * | 3/1979 | Hamrick ................. F25B 27/00 |
| | | | | 62/324.1 |
| 4,537,146 | A | | 8/1985 | Wainwright |
| 5,140,170 | A | * | 8/1992 | Henderson ................ F03D 9/28 |
| | | | | 290/55 |
| 5,570,859 | A | | 11/1996 | Quandt |
| 5,895,015 | A | | 4/1999 | Saiz |
| 6,216,454 | B1 | | 4/2001 | Tsuzuki |
| 6,247,670 | B1 | | 6/2001 | Eliahou-Niv |
| 6,499,690 | B1 | | 12/2002 | Katayama et al. |
| 6,988,357 | B2 | | 1/2006 | Dev |

(Continued)

FOREIGN PATENT DOCUMENTS

| EP | 2 006 537 A2 | 12/2008 |
| RU | 2193090 C1 | 11/2002 |

(Continued)

OTHER PUBLICATIONS

PCT Notification of Transmittal of the International Search Report and the Written Opinion of the International Searching Authority, or the Declaration, International Searching Authority, International Application No. PCT/US2013/077987, dated Jun. 2, 2014, 9 pages.

(Continued)

*Primary Examiner* — Dominick L Plakkoottam
(74) *Attorney, Agent, or Firm* — Cesari and McKenna, LLP

(57) ABSTRACT

A power generating windmill having a plurality of blade extending radially outward from a central rotor in position to be engaged by a moving fluid stream is provided. Each blade partially overlaps the blade prior to and behind it to increase lift forces on the blades.

10 Claims, 15 Drawing Sheets

(56) References Cited

U.S. PATENT DOCUMENTS

| | | | |
|---|---|---|---|
| 7,204,674 B2 | 4/2007 | Wobben | |
| 7,293,959 B2 | 11/2007 | Pedersen et al. | |
| 7,989,973 B2 | 8/2011 | Birkestrand | |
| 8,651,813 B2* | 2/2014 | Long | B63B 35/7926 |
| | | | 416/90 A |
| 8,742,610 B2* | 6/2014 | Brown | F03D 7/0244 |
| | | | 290/44 |
| 9,004,864 B2* | 4/2015 | Stimm | F03D 1/0641 |
| | | | 416/27 |
| 9,187,987 B2* | 11/2015 | Greene | E21B 43/12 |
| 9,328,576 B2* | 5/2016 | Cramer | E21B 34/10 |
| 9,835,140 B2* | 12/2017 | Henderson | F03D 7/04 |
| 2011/0079010 A1* | 4/2011 | McBride | F03G 6/00 |
| | | | 60/641.1 |
| 2011/0116923 A1 | 5/2011 | Larsen et al. | |
| 2011/0142681 A1 | 6/2011 | Fisher et al. | |
| 2012/0061972 A1* | 3/2012 | Young | F03D 3/065 |
| | | | 290/55 |
| 2012/0104752 A1* | 5/2012 | Tsutsumi | F03D 15/20 |
| | | | 290/44 |
| 2012/0161442 A1* | 6/2012 | Chapple | F03D 7/0276 |
| | | | 290/43 |
| 2017/0211829 A1* | 7/2017 | Slack | F24D 12/00 |
| 2018/0298881 A1* | 10/2018 | Mathers | F03D 15/20 |

FOREIGN PATENT DOCUMENTS

| | | |
|---|---|---|
| RU | 2224077 C2 | 2/2004 |
| WO | WO 2008/111922 A2 | 9/2008 |
| WO | WO 2009/097850 | 8/2009 |
| WO | WO-2015/012677 A1 | 1/2015 |

OTHER PUBLICATIONS

"Notification of Transmittal of the International Search Report and the Written Opinion of the International Searching Authority, or the Declaration," International Filing Date: Feb. 26, 2021, International Application No. PCT/US2021/019925, Applicant: Birkestrand, Orville J., dated Jun. 9, 2021, pp. 1-15.

* cited by examiner

US 11,384,734 B1

WIND TURBINE

CROSS-REFERENCE TO RELATED APPLICATIONS

The present application is related to U.S. patent application Ser. No. 13/729,205, which was filed on Dec. 28, 2012, by Orville J. Birkestrand for a POWER GENERATION APPARATUS, the contents of which are hereby incorporated by reference.

BACKGROUND

FIG. 1 is a side view of an exemplary prior art farm windmill 100 as is well known to those skilled in the art. The windmill 100 includes a plurality (typically 18) of blades 105 that are configured in a substantially circular arrangement and operatively interconnected with a gearbox 110. A platform 115 is arranged slightly below the bottom level of the blades to enable easy access to the blades and/or gearbox for maintenance purposes, etc. The gearbox 110 is operatively interconnected with a pump pole 120 which terminates in a connector 125. The connector 125 is further interconnected with a pump rod 130 that is encased by a standpipe 135 that extends into a well 140. Typically, a well casing 145 surrounds the entry into the well and provides support for a discharge point 150.

A windmill tower 160 provides structural support so that the blades 105 are located at a substantial height above the ground to enable wind to reach them without obstructions from buildings, terrain, etc. The tower 160 also provides support to counteract the forces caused by the blades 105 rotating in the wind, which may be a lateral force that could cause the windmill to tip over if the wind reaches a sufficient velocity. As such, windmills 100 typically are configured to rotate out of the wind in the event that wind speed reaches a predetermined threshold. This protects the blades and tower from damage and/or destruction caused by the blades rotating at too high a speed and/or generating too much lateral force on the tower 160.

In operation, the wind causes the blades 105 to spin, thereby turning the gearbox 110, which activates the pump via the pump rod 130 to provide a conventional pumping mechanism to draw water from the well's reservoir to be discharged out the discharge point 150. As will be appreciated by those skilled in the art, the farm windmill 100 is typically limited to pumping water (or other fluid). A conventional farm windmill 100 is further limited to certain wind speeds and has a very low efficiency.

FIG. 2 is an exemplary front perspective view of a modern wind turbine 200 that may be utilized for power generation. The wind turbine 200 comprises a plurality (typically three) of blades 305 that are mounted on a hub 315 that is supported by a tower 355. Typical modern wind turbines are mounted at heights on the order of tens of meters (e.g., 90 meters) with blades that are also on the order of tens of meters long. Modern wind turbines 200 often encase all operating components within the tower 355 or within the supporting base 365. As such, external views of the wind turbine do not display its operation as it does for a conventional farm windmill 100.

FIG. 3 is an exemplary side cross-sectional view of a conventional wind turbine 300 such as that currently utilized for power generation. A plurality (typically three) of blades 305 are arranged in a circular arrangement centered on a rotor hub 315. In operation, as the rotors 305 spin due to the wind, the rotor hub 315 turns a gearbox 320 that may be moderated by a brake 325. The brake 325 may be utilized to slow the blades 305 in the event of high wind environments. Further, the brake 325 may be utilized to stop the rotation of the blades 305 in order to perform certain operations, e.g., maintenance on the gearbox 320. The gearbox 320 then turns a generator 335 to produce electrical power. These components may be mounted within a nacelle 340 to protect them from the elements.

A rotatable wind orientation control module 345 may enable the nacelle 340 to rotate based on the direction the wind is blowing. The tower 355 supports the nacelle 340 and rotors 305 at a sufficient height to avoid obstructions to the wind. Illustratively, within tower 355 is an access ladder 350 that enables personal to access the nacelle 340 and components therein. At the base of the tower, a connection to the electrical grid 360 is provided. Due to the size of modern wind turbines, they are typically arranged in large sites (wind farms) at remote locations distant from the location where the generated electricity is utilized. This results in the need for large transmission systems with a concomitant loss of energy along lengthy transmission lines, etc.

Conventional three-bladed windmills/wind turbines capture only about 6% of the lift forces generated because they normally operate at tip speed ratios (TSR) of 6 or more. The remainder of the lift forces is counteracted by trying to overturn the tower. As noted above, this causes the towers 160, 355 and foundations 365 to be overbuilt in order to prevent the tower from being tipped over. Further, conventional windmills capture none of the possible reaction forces and the flow from one blade does nothing to enhance the flow or other forces of neighboring blades. Under conventional thinking, all wind machines are limited by the Betz law that states that no turbine can capture more than $16/27$ (59.3%) percent of the kinetic energy in the wind. This factor $16/27$ (or 0.593) is known as the Betz limit. Conventional three bladed windmills currently peak at approximately 75 to 80% of the Betz limit. The Betz limit places a theoretical upper bound amount of energy that may be extracted at any particular windmill site. Even assuming (hypothetically) that the wind blew in a particular location continuously, no more than the Betz limit of the energy obtained in that year's wind may be extracted. In practice, most systems do not reach a performance rate of even 50% of the Betz limit. The vast majority have typical rates of 7 to 17%.

A further noted disadvantage of modern wind turbine operation is that their relatively rapidly rotating rotor blades produce annoying sounds and may be a danger to flying animals, such as birds. For these and other reasons, conventional wind turbines are not practical or desirable for use in or near urban/suburban neighborhoods where the vast amount of power is consumed. Rather, as noted above, they are typically placed in large groups (i.e., wind farms) at locations where they may be serviced efficiently and where they are exposed to high velocity winds. As a result, they require extensive transmission systems to carry the generated electricity to where it is needed.

Further, for all prior art wind machines, their energy harvested does not increase faster than $D^2$. An additional major disadvantage of prior art wind turbines is that they operate of tip speed ratios (TSRs) of 6 or more, which requires that they must be located on exceptionally tall towers and are recommended to be located a substantial distance (e.g., 500+ feet) from any obstructions, such as trees, buildings or other wind machines in order to function properly. Further, with TSRs of 6 or more, should a wind gust come along and lower the TSR to, e.g., 5, conventional 3-bladed wind turbines typically will have flow separation and loss of power.

Thus, there is a need for a wind driven power generating system which can economically and safely extract useful power from lower speed wind currents commonly found near major population centers to generate electricity closer to the point of energy consumption, thereby reducing environmental degradation and saving the capital expense and losses of long power transmission systems.

SUMMARY

The disadvantages of the prior art are overcome by providing a wind turbine that utilizes lift and reactive forces to achieve an efficiency greater than that predicted by the Betz coefficient. The exemplary wind turbine illustratively comprises of a plurality (e.g., 12) of high lift, overlapping, radially tapered interacting blades that are oriented and speed control relative to the free wind. In an alternative embodiment, the outer edges of the blades may have Hoerner blade tips, which virtually increases the blades' effective outer diameter and thereby the amount of energy produced. The usual streamlined nose cone is replaced with an inverted dish, which increases the average velocity through the blade array, thereby increasing the harvested energies. The wind turbine illustratively operates at a tip speed ratio (TSR) of approximately 3 or less as compared to the TSR of 6 or more for conventional three bladed windmill designs. The lower TSR provides an advantage of not causing flow separation should a wind gust temporarily lower the TSR to, e.g., 1 or 2. The blades illustratively overlap slightly, which helps to achieve accelerating flow off of each blade's trailing edge to enhance the lift and reactive forces of nearby blades. For conventional wind machines, the energy harvested does not increase faster than $D^2$, while the system of the present disclosure increases as $D^3$ due to the harvesting of both lift and reaction force energies.

A hydraulic control system is provided to transfer heat energy for use in heating/cooling a residence or other building. The exemplary wind turbine provides ease-of-use and a high energy output in environments where conventional windmills or wind turbines cannot operate efficiently. Thus, a wind turbine of the present invention may be utilized in a suburban location to, for example, provide power to a home, school, or business location, etc. on site without the need for a large remotely located wind farm installation or substantial power transmission or distribution systems.

BRIEF DESCRIPTION OF THE DRAWINGS

The above and further advantages of the present invention are described in connection with the accompanying drawings in which like reference numerals indicate identical or functionally equivalent elements.

DETAILED DESCRIPTION OF AN ILLUSTRATIVE EMBODIMENT

Figure 1:
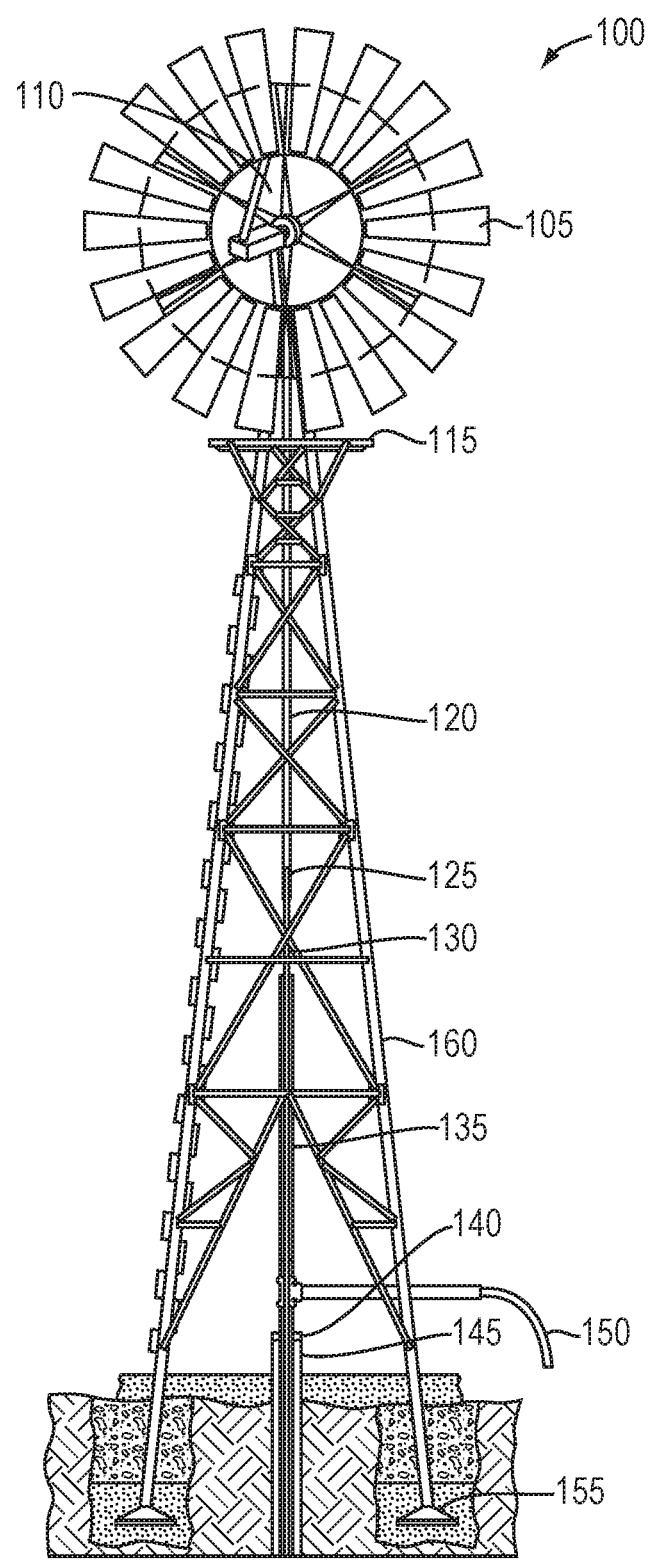
FIG. 1, previously described, is a front view of an exemplary farm windmill as is known in the prior art.
Figure 2:
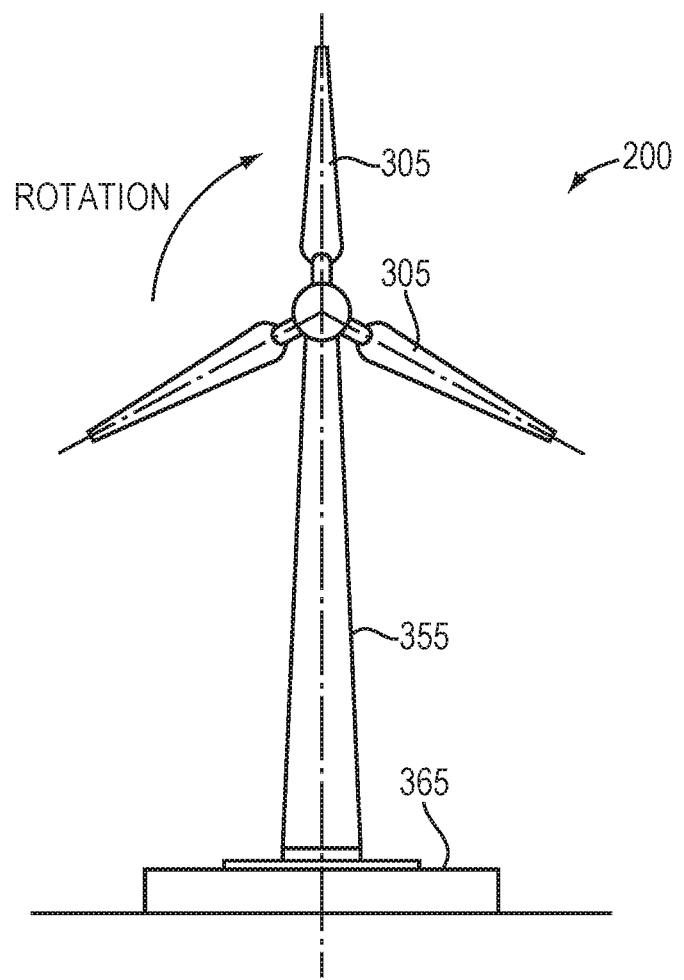
FIG. 2, previously described, is a front view of an exemplary three blade wind turbine as is known in the prior art.
Figure 3:
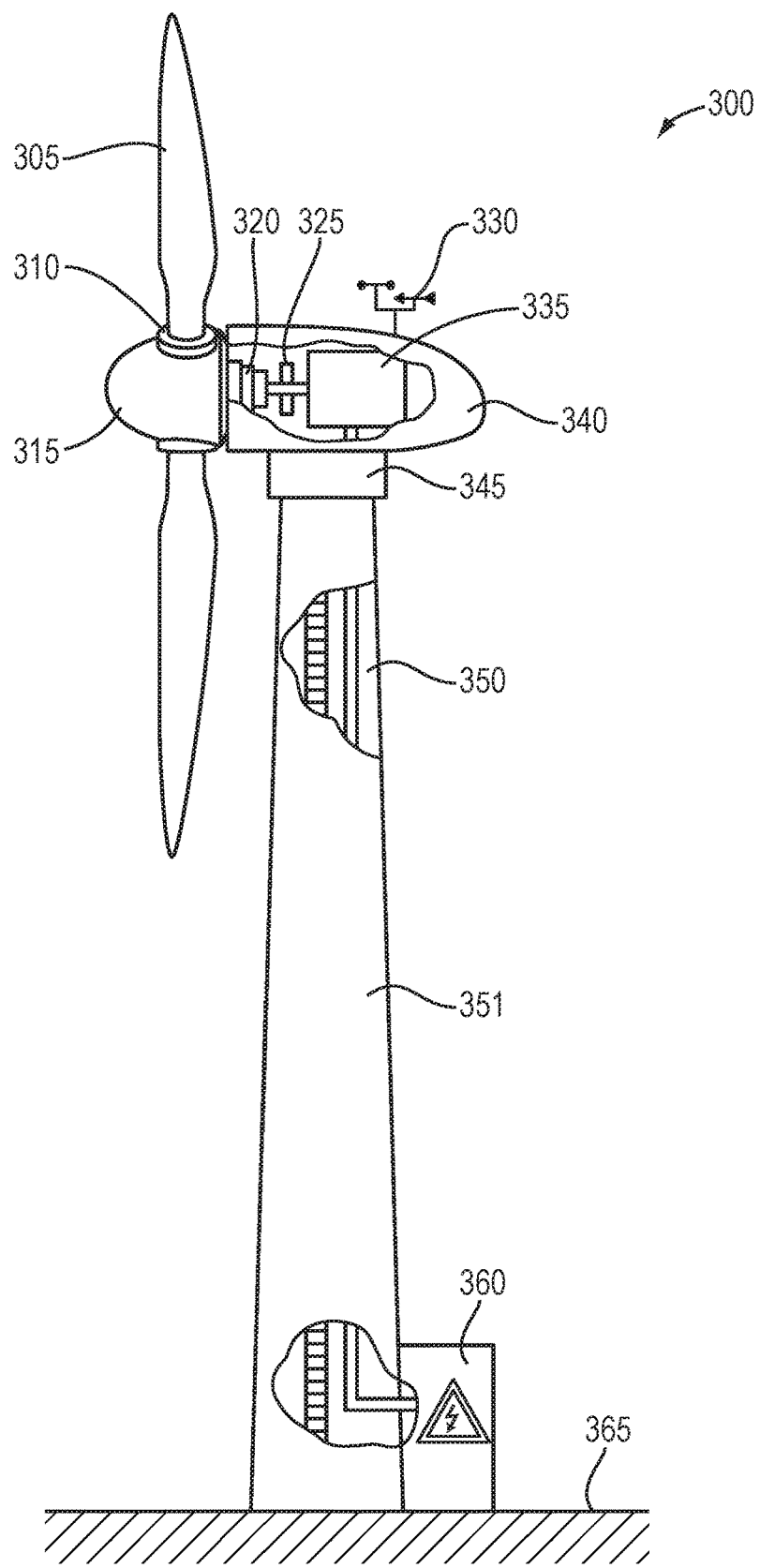
FIG. 3, previously described, is a side cross sectional view of a conventional wind turbine as is known in the prior art.

As noted above, Betz's Law conventionally states that the maximum efficiency of all machines designed to extract energy from a flowing stream (wind or other fluid) is limited to $16/27$ or 59.3% of its kinetic energy by claiming that this is demanded by the law of conservation of energy. While Betz's Law appears to apply to existing machines, this appearance is coincidental and not causal. As noted above, conventional three bladed wind machines harvest, at best, approximately 6% of the lift forces developed and 0% of the reaction forces. The best or most efficient machines from low wind speeds up to approximately 18 miles an hour is an old farm windmill, described above in relation to FIG. 1. Typical farm windmills will rotate out of the wind stream at speeds above approximately 18 miles an hour. The illustrative wind turbine of the present invention utilizes lift forces to harvest a greater amount of energy from the wind, thereby resulting in a more efficient machine than conventional farm windmills and/or modern three bladed wind turbines.

Specifically, Betz's law is based on a simplified version of the Bernoulli Equation that is expressly only for incompressible irrotational flows. This is a reasonable assumption for conventional windmills. However, the wind turbine (windmill) made in accordance with various embodiments of the present invention creates and greatly enhances highly rotational flows, which augment and reinforce the normal lift forces that are generated. Lift and reactive forces, which were not known in Bernoulli's time, may be utilized to increase the amount of energy harvest a significantly greater amount of energy from the wind.

Figure 4:
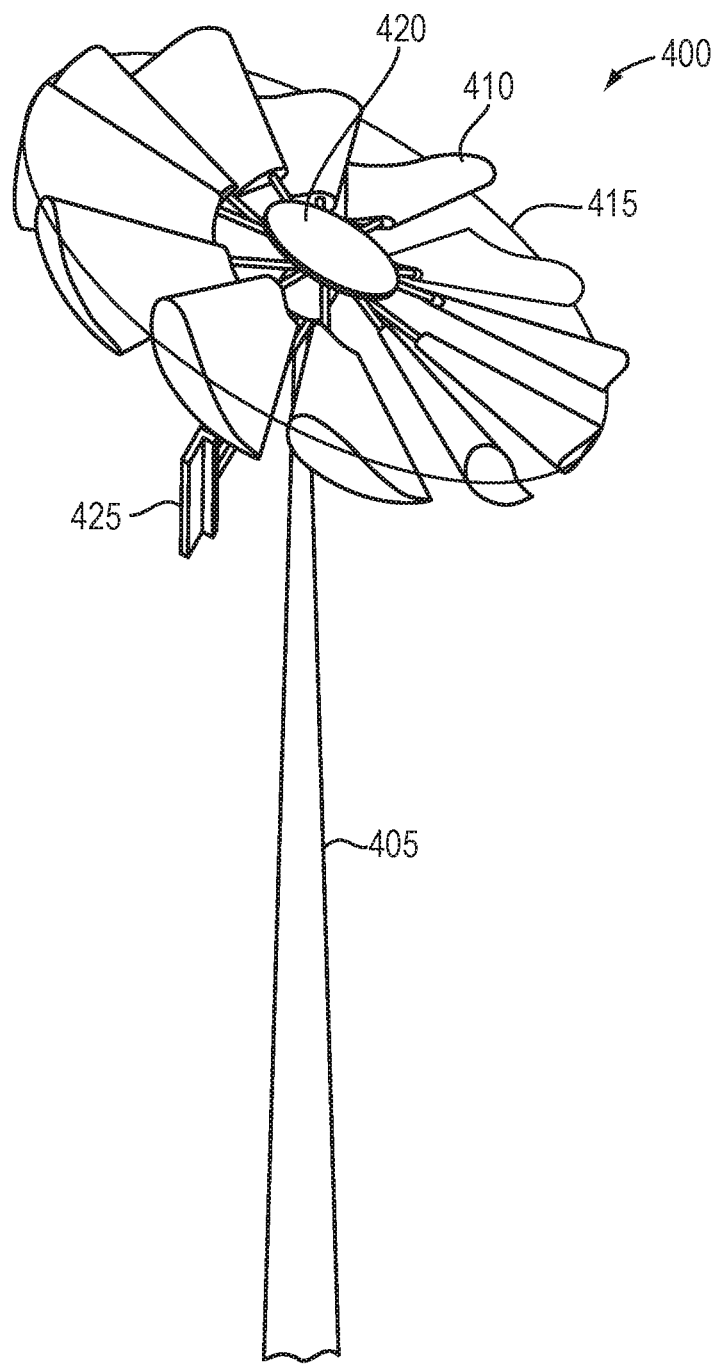
FIG. 4 is a perspective view of an exemplary windmill in accordance with an illustrative embodiment of the present invention.

FIG. 4 is an exemplary view of a wind turbine (windmill) 400 in accordance with an illustrative embodiment of the present invention. The windmill 400 may be illustratively supported at an elevated position by a tower 405. The tower 405 is illustratively supported by a variety of types of bases in accordance with alternative embodiments of the present invention. In one embodiment, the tower 405 may be anchored to a base (not shown) that is permanently fixed. In an alternative embodiment of the present invention, the tower 405 may be anchored to a pivoted base (not shown) that enables the tower to be moved between a raised position and a lowered position. An exemplary pivoted base may enable ease of maintenance, replacement, and/or repairs by enabling the windmill 400 to be lowered to a position closer to the ground. As will be appreciated by those skilled in the art, such a pivoted based would obviate the need for ladders or other lifting mechanisms to enable, for example, access to elements of the windmill for repair/maintenance purposes.

The windmill 400 illustratively comprises of a nose dish 420, a plurality of blades 410 extending from a central point to an exterior framework 415 and a tail component 425. It should be noted that in alternative embodiments of the present invention, windmill 400 may comprise additional and/or differing components. As such, the description contained herein of specific components should be taken as exemplary only.

The exemplary blades 410 overlap each other, as described further below in relation to FIG. 6. This overlap enables the capturing of additional lift forces to improve the overall efficiency of the windmill 400. Given the capture of additional efficiencies, the windmill 400, in its various embodiments described herein, may achieve energy efficiencies that exceed the Betz's law. This is accomplished by utilizing the lift forces in addition to the conventional wind forces. By achieving this higher efficiency, a windmill as described herein may be made smaller to achieve a comparable energy output. Further, windmills may be located in areas of lower or more inconsistent wind speeds as it is capable of harvesting more of the energy available then conventional prior art windmills. The smaller size enables placement in residential or other areas without violating zoning or land use regulations, thereby enabling a greater use of renewable energy.

Figure 5:
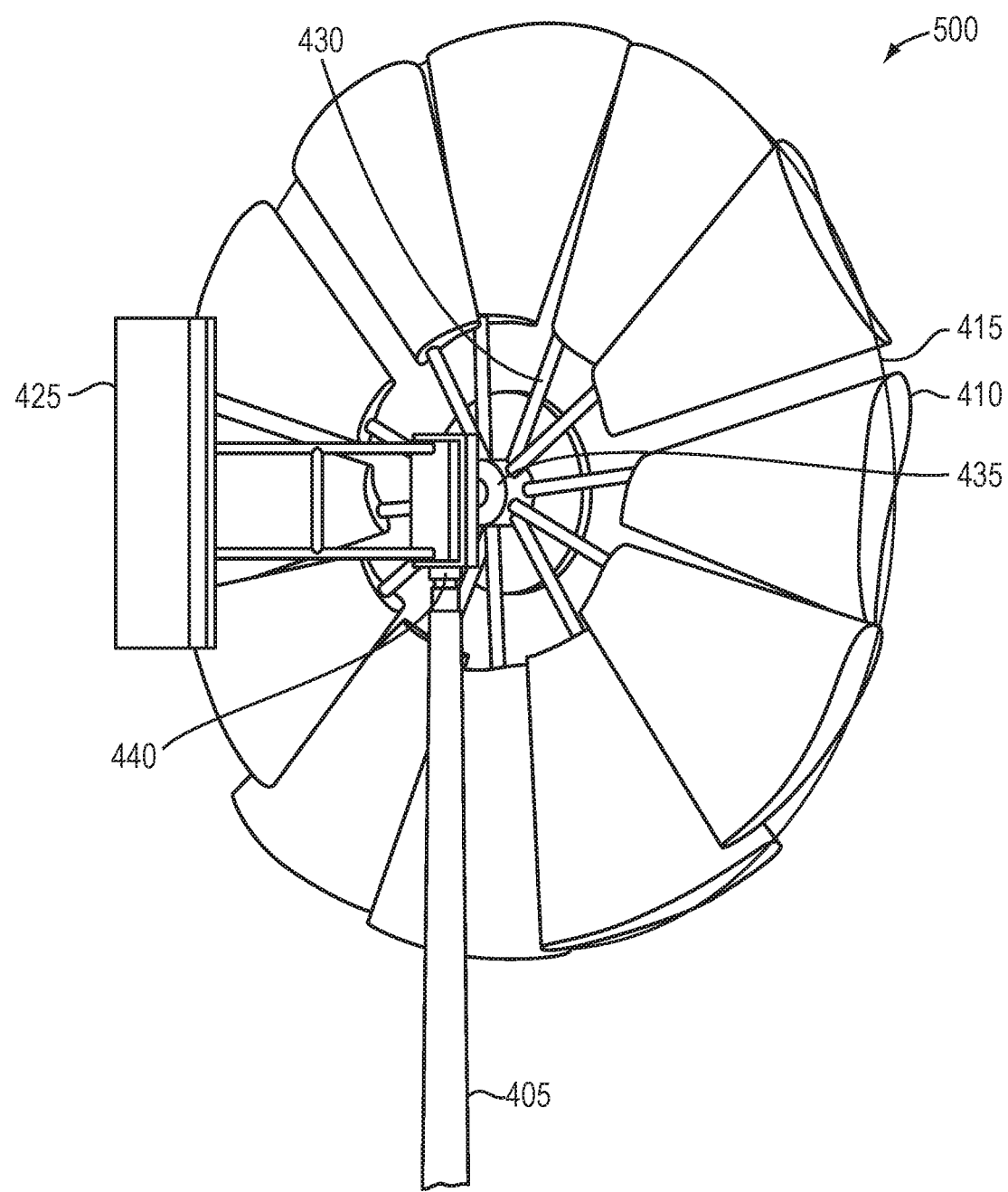
FIG. 5 is a detailed view of the rear of an exemplary windmill in accordance with an illustrative embodiment of the present invention.

FIG. 5 is an exemplary diagram illustrating a rear view 500 of a windmill 400 in accordance with an illustrative embodiment of the present invention. Exemplary view 500 illustrates the overlap of blades 410, which is described in additional detail below in relation to FIG. 6. Further, an exemplary swivel assembly 440 is shown that enables the windmill to rotate so that it faces the direction of the wind. Further, the various blades 410 are shown being operatively connected with a central rotor 435. It should be noted that while the blades are shown as being connected in offsetting pattern to the rotor 435, it is expressly contemplated that in alternative embodiments of the present invention, blades may be connected to the rotor in a non-alternating pattern. As such, the description of blades being connected to the rotor in an alternating pattern should be taken as exemplary only.

Figure 6:
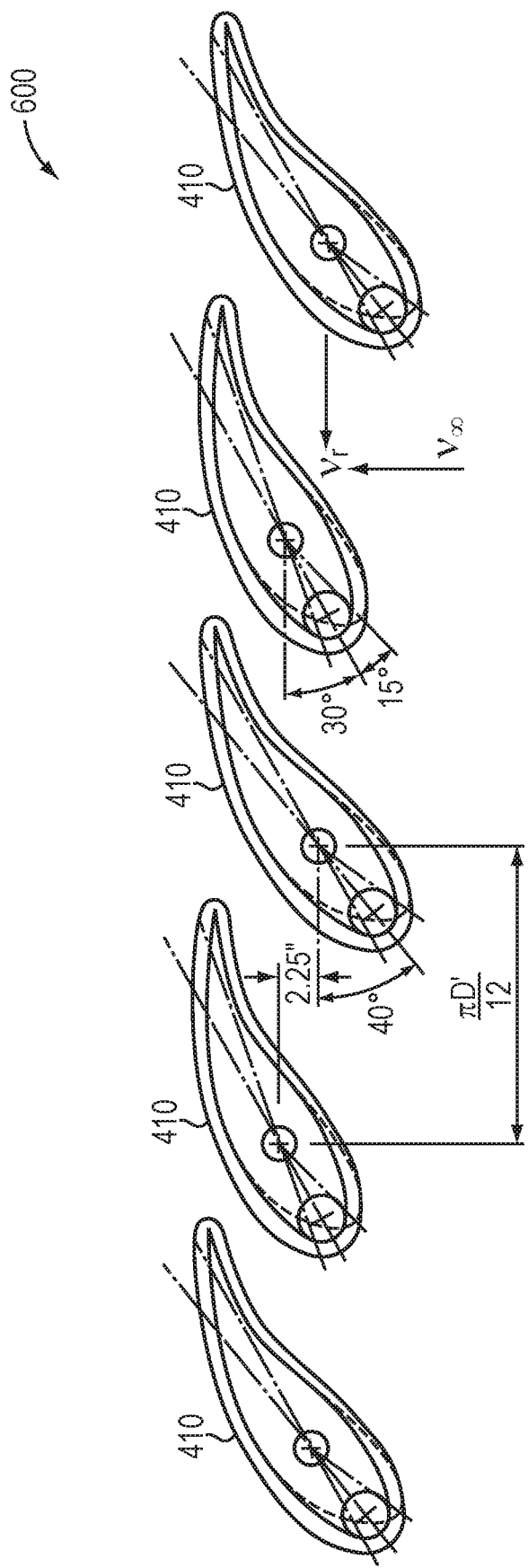
FIG. 6 is an exemplary diagram illustrating rotor placement and overlap in accordance with an illustrative embodiment at the present invention.

FIG. 6 is an exemplary diagram 600 illustrating overlapping blades 410 in accordance with an illustrative embodiment of the present invention. Five exemplary blades 410 are shown within diagram 600. The blades are shown as having their centers offset in an alternating pattern by a predetermined distance. In one exemplary embodiment, this distance is 2.25 inches. However, it should be noted that in alternative embodiments differing offsets may be utilized. As such, the description of a 2.25 inch offset should be taken as exemplary only. Further the blades exemplary overlap with each other. Illustratively, this overlap is equal to ⅙ of the chord of the blade. That is, seven blades will fit into the space that six would normally occupy, i.e., a 7/6. This overlap enables flow off one blade to improve the flow of the next with the use of reactive forces to generate additional energy.

Figure 7B:
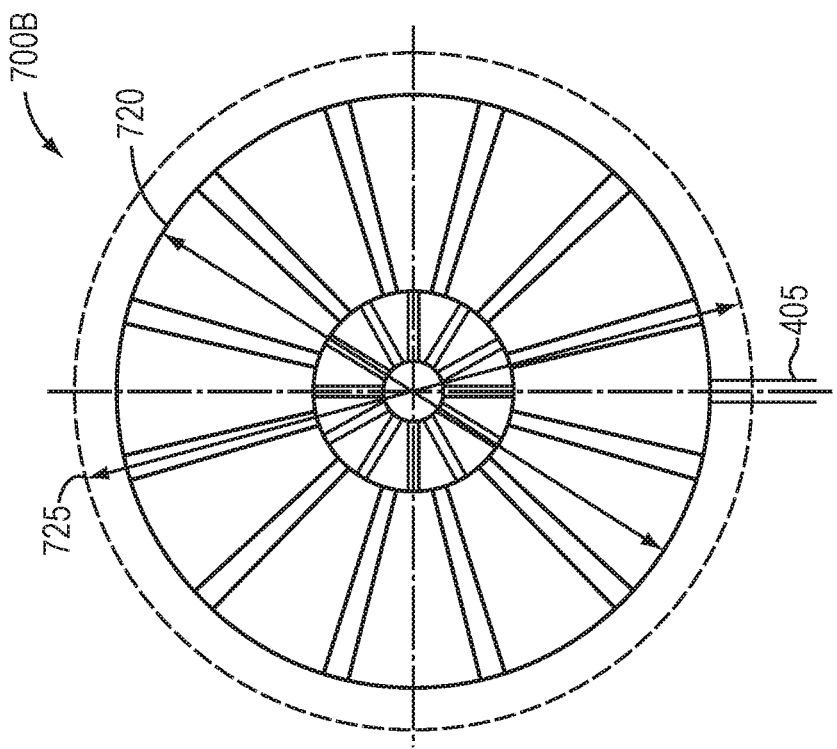
FIG. 7B is an exemplary diagram illustrating the effective radius of a windmill using a Hoerner wing tip in accordance with an illustrative embodiment of the present invention.
Figure 7A:
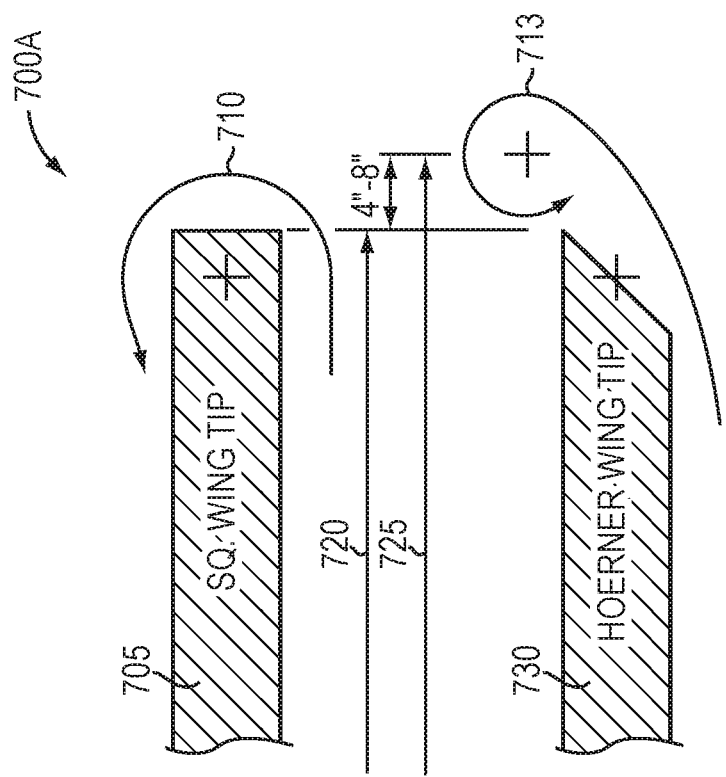
FIG. 7A is an exemplary diagram illustrating exemplary blade wing tip designs in accordance with illustrative embodiments of the present invention.

FIG. 7A is an exemplary diagram 700A illustrating vortices around differing wing designs in accordance with alternative embodiments of the present invention. In one illustrative embodiment of the present invention, the various blades 410 utilize a square wing tip, which is shown in cross-section 705. Such a square wing tip 705 generates a circular wind flow as shown by line 710. This generates an effective length of the blade equal to the length of the blade as shown by distance 720. In an alternative embodiment of the present invention, the edges of the windmill blades may have a beveled edge, such as a Hoerner wing tip design. This Hoerner wingtip is shown in cross-section 730. The Hoerner wing tip generates a flow as shown in flow 713.

Due to the resulting flow from the Hoerner wing tip, the effective length of the blade may be increased to a distance longer than the physical length of the blade. Thus, while the square wing tip and the Hoerner wing tip may have a physical length equal length 720, the Hoerner wing tip has an effective length equal to 725, which is larger than its physical length. In one exemplary embodiment, this additional length may be on the order of 4 to 8 inches per side. However, it should be noted that in alternative embodiments of the present invention, the additional length may vary depending on design choices. As such, the description of an increased length of 4 to 8 inches should be taken as exemplary only.

It should be noted that alternative wing tip designs may be utilized in alternative embodiments of the present invention to achieve some or all of the same effects as Hoerner wingtips. Therefore, the description of square and/or Hoerner wing tips should be taken as exemplary only. Any wing tip design that increases the effective length of a blade may be utilized in alternative embodiments of the present convention to increase the overall surface area of the windmill (wind turbine).

FIG. 7B is an exemplary 700B diagram illustrating the increased surface area of the effective size of a windmill when using a Hoerner wing tip in accordance with an illustrative embodiment of the present invention. The windmill 400 illustratively utilizes a Hoerner wing tip and has a physical length of blades equal to length 720. However due to the increase in the effective length of the blades, the effective size of the windmill is denoted by distance 725. This increase in effective length may substantially increase the overall surface area of the windmill, with a concomitant increase in power generating ability. Assuming that the effective radius of a blade is given as ER, while the actual radius of a blade is given by the value AR, the additional surface area of the windmill may be calculated by $\pi ER^2 - \pi AR^2$. This additional surface area provides additional kinetic and lift forces that may be utilized by the windmill in accordance with various embodiments of the present invention.

Figure 8:
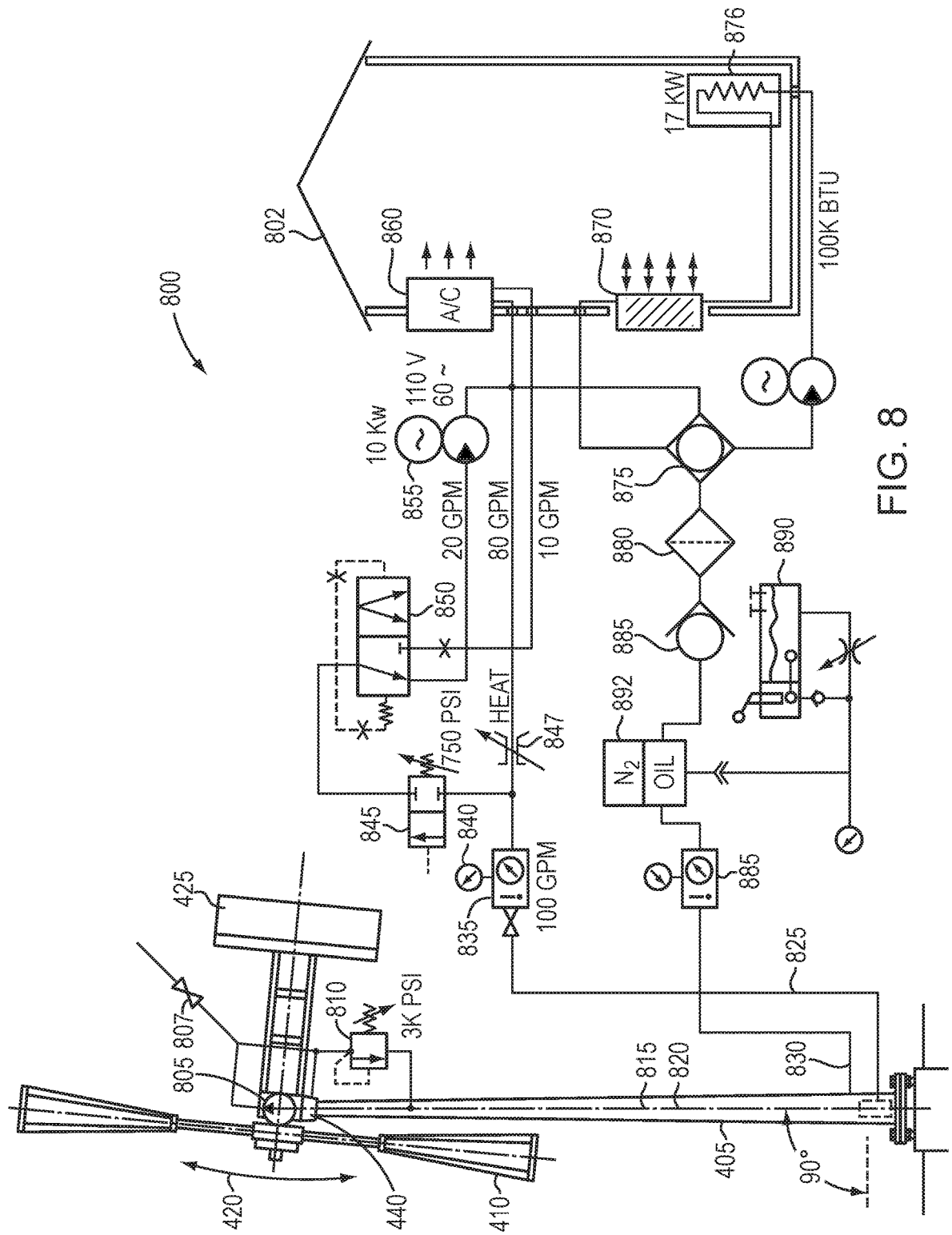
FIG. 8 is a schematic diagram of an exemplary windmill system in accordance with an illustrative embodiment of the present invention.

FIG. 8 is a schematic diagram of an exemplary heating and cooling system 800 in accordance with an illustrative embodiment of the present invention. An exemplary wind turbine is provided having a plurality of blades 410 with nose cone 420. The windmill is mounted on an exemplary tower 405. As noted above, the exemplary tower 405 may be configured to tilt approximately 90° to lower it from an approximately vertical position to an approximately horizontal position. This enables ease-of-use and maintenance for repairs, inspections, etc. It should be noted that in alternative embodiments of the present invention, tower 405 may be configured to not rotate. Further, in alternative embodiments, the tower may be of a telescopic nature. As such, the various descriptions of tower 405 should be taken as exemplary only.

The windmill includes an exemplary yaw/swivel assembly 440 that enables the windmill to turn to face in the direction of the wind. This enables the windmill to face the wind to engage the blades to generate lift and energy as described further below. An exemplary pressure relief valve 810 is located close to the top of tower 405. The pressure release valve 810 may be engaged in response to, for example, the hydraulic pressure exceeding a predefined limit. Illustratively, the limit may be 3000 psi; however, it should be noted that in alternative embodiments, differing limits may be placed. As such, the description of a particular pressure causing the pressure release valve 810 to release should be taken as exemplary only. Additionally, an air bleed valve 807 may be located on the top of the tower to enable air that has entered the hydraulic system to be bled off. In accordance with alternative embodiments, the air bleed valve 807 may be located in other locations in the system.

The tower 405 contains a plurality of fluid lines including an exemplary pressure line 810 and a tower return line 820. These lines 815, 820 are utilized to provide hydraulic pressure to the wind turbine pump 805 to ensure no voids in the pump intake as well as return pressure to the remainder of the system 800. External to the tower 405 these lines illustratively become external pressure and return lines 825, 830. In accordance with an illustrative embodiment, these lines are approximately 1.25 inches in internal diameter. However, it should be noted that in alternative embodiments, the lines may be of differing sizes. As such, the descriptions herein of the lines having a particular internal diameter should be taken as exemplary only. Exemplary pump 805 is operated by wind turbine to pump hydraulic fluid from an accumulator 892 up through return lines to the pressure line. It should be noted that while pump 805 is shown on top of tower 405, in alternative embodiments, the pump 805 may be located external to the tower. As such, the location of pump 805 depicted should be taken as exemplary only.

The pressure line 825 flows to an exemplary shut off valve 835 that is operatively connected with a flow/temperature/pressure meter 840. Following the shut off valve 847, the flow then heads to a pressure actuated 2-way valve 845, which turns on at a preset pressure, before heading to a priority valve 850. The preset pressure at which the pressure actuated 2-way valve 845 operates is illustratively 750 psi; however, it should be noted that in alternative embodiments the pressure may be different. As such, the description of valve 845 operating at 750 psi should be taken as exemplary only. From the priority valve 850, the flow then heads to an exemplary priority generator 855. Only when that flow request is satisfied is flow directed to power an exemplary hydraulic motor powered air-conditioning unit 860 within a residence 802. Illustratively, the generator 855 may comprise a conventional alternating current (AC) generator that produces 110V at 60 Hz. It should be noted that in alternative embodiments, the generator may produce differing voltages and/or frequencies. These may vary based on local electrical requirements. As such, the description of generator 855 producing 110V at 60 Hz should be taken as exemplary only. It should be noted that while this description was written in terms of a residence 802, the principles of the present invention may be utilized with any appropriate building, such as a commercial enterprise, industrial factory, farm barn, etc. As such, the description of a residence 802 should be taken as exemplary only. Also located within residence 802 is an exemplary heating system 870.

Illustratively, the flow also exits the priority valve 850 and proceeds to a heat exchanger 875 that is used to heat the residential heating system 870. The flow may also proceed to an indirect water heater 876 that, in accordance with an illustrative embodiment, produces hot water for on-demand and radiant heating for the residence 802. After the heat exchanger, the flow proceeds to a filter 880 before proceeding to a check valve 885. Following the check valve 885, the hydraulic flow continues to an accumulator 892, which acts as a pressurized make up tank. Illustratively, the accumulator is filled with $N_2$ to prevent air from entering the system. A hand pump 890 may be connected to the accumulator to enable a user recharge the system to bring pressure to a desired level.

Figure 9:
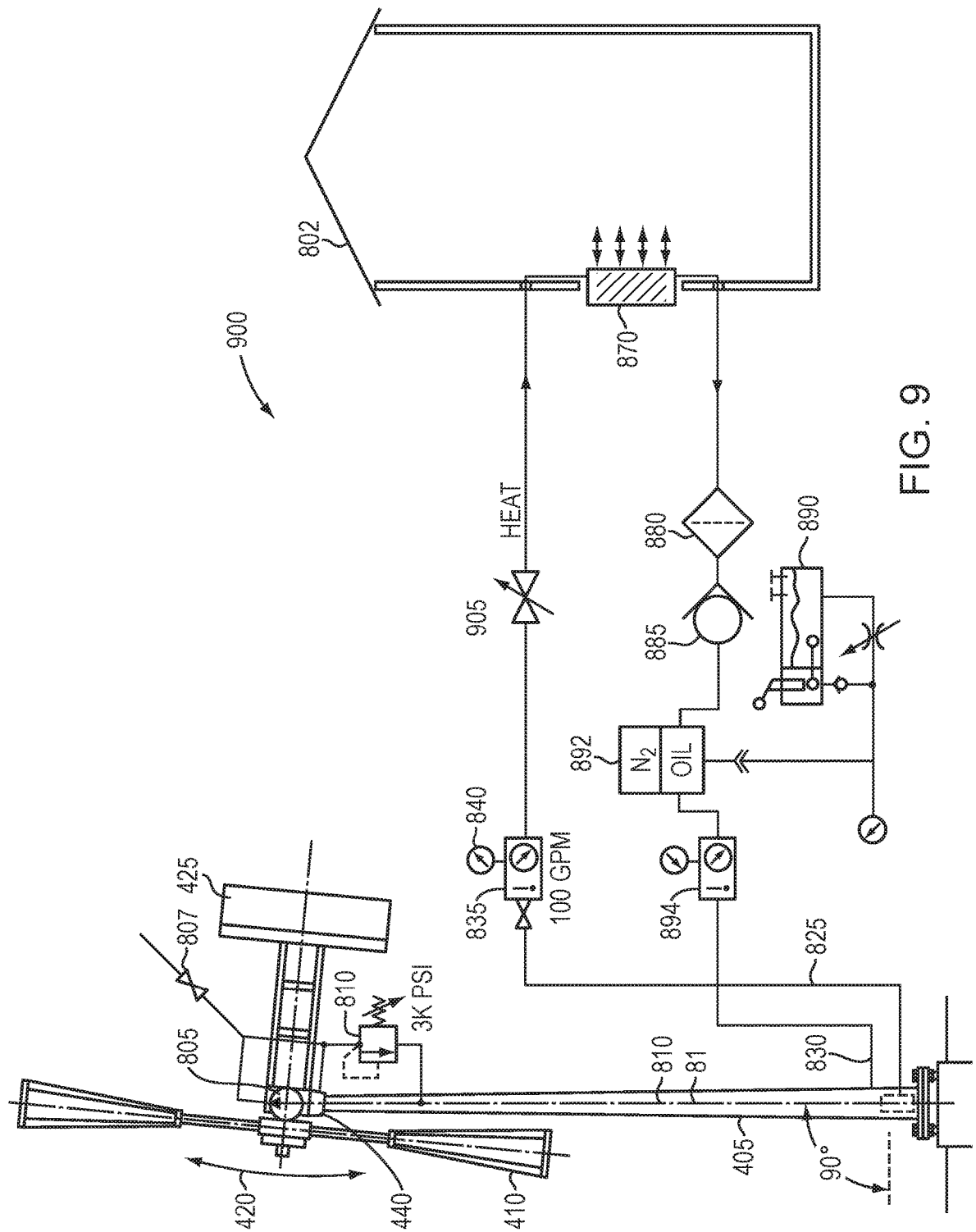
FIG. 9 is a schematic diagram of an exemplary windmill system in accordance with an illustrative embodiment of the present invention.

FIG. 9 is an exemplary schematic diagram of an exemplary heating system 900 in accordance with an illustrative embodiment of the present invention. System 900 is a simplified version of system 800, described above in relation to FIG. 8. In exemplary system 900, the wind turbine 400 only provides heating for a residence 802 or other building. Similar to the system described above in relation to FIG. 8, system 900 comprises a plurality of blades 410 that are relatively arranged in an overlapping manner as previously described. In operation, an exemplary hydraulic pump 805 is operated by the turning of the rotor blades. A pressure relief valve 810 is provided in the event that the hydraulic pressure exceeds a predetermined level. Within the tower 405 is an illustrative pressure line 810 as well as return line 815. At the base of the tower, which, as noted above in relation to system 800, may comprise a foldable and/or telescopic tower, an external pressure 825 and relief line 830 exit. The pressure line 825, which is illustratively 1.25 inches in diameter, proceeds to an illustrative flowmeter 835.

In accordance with an illustrative embodiment of the present invention, the flowmeter 835 may have a combo pressure/temperature/flow gauge 840 contained therein. After passing through the flowmeter 835, the hydraulic fluid continues to a combo shut off adjustable orifice 905 before proceeding into an illustratively heating system 870 contained within the residence 802 or other building. Heat is created when the pressurized working fluid is reduced in pressure passing through the orifice, which also serves to regulate the speed (RPM) of the wind turbine. Pressure through the orifice drops in relation to square of the velocity through the orifice, as detailed below in relation to FIG. 15. The velocity of the fluid through the orifice is proportional to the free wind velocity because of the positive displacement pumps' 805 speed is linearly proportional to the free wind speed.

Once the fluid has exited the heating system 870 it continues to a filter 880 before continuing to pressure check valve 885. An exemplary pressure tank, i.e., accumulator, 892 is provided that may be operatively interconnected with a hydraulic hand pump assembly 890. The system then continues on as the return piping into the base of the tower 405. Illustratively at the point of return, the inner diameter of the return pipe 830 is 1½ inches of inner diameter. As will be appreciated, the heat only system is of a simpler design than that described above in relation to FIG. 8.

Figure 10:
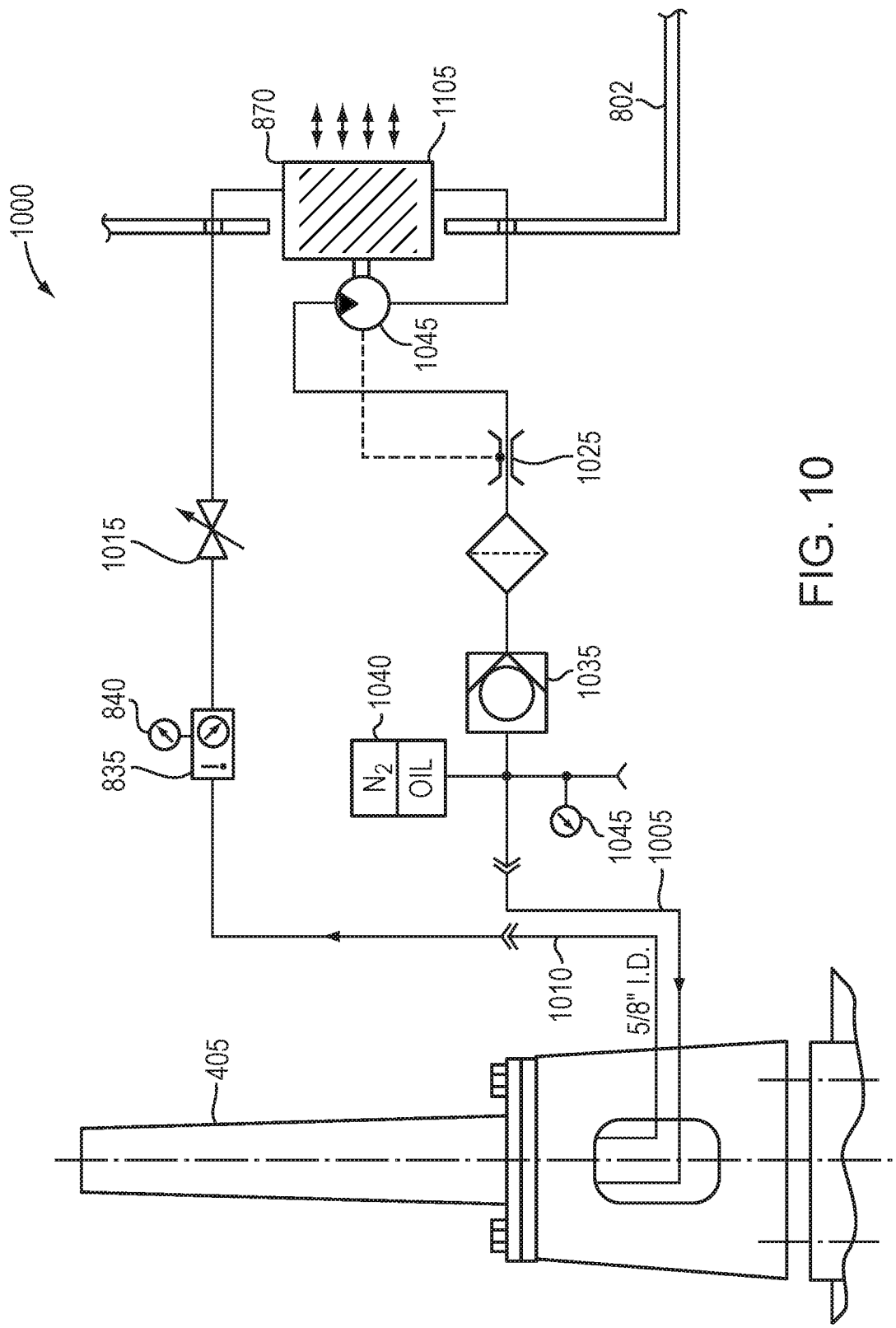
FIG. 10 is a schematic diagram of an exemplary windmill system in accordance with an illustrative embodiment of the present invention.

FIG. 10 is a schematic diagram of an exemplary wind turbine heating system 1000 for heating in accordance with an illustrative embodiment of the present invention. The system 1000 is a further simplified version the system described in relation to FIG. 9. Exemplary system 1000 is designed to be installed at a low cost for a residential homeowner, thereby enabling more people to utilize such a heating system. System 1000 as shown in FIG. 10 illustratively excludes blades and top of tower assembly for ease of illustration. Such an assembly may be utilized such as that previously described in relation to systems or FIGS. 8 and 9. Exiting from the base of the tower 405 is an illustrative hydraulic pressure line 1010 that proceeds to a combo gauge measuring temperature/pressure/flow 840. Once past the combo gauge the pressurized hydraulic fluid then continues to an exemplary adjustable orifice/shut off control unit 1105. In accordance with the illustrative embodiment, the control of the heater vent shutters 1105 may be turned to allow cooling or heating as desired by an owner or resident of the residence or other building by adjusting the flow through the adjustable orifice/shut off valve 1105. Once past the valve 1105, heated de-pressurized fluid continues to an illustrative heating unit 870 within the residence 802. Once through the heating unit it continues to a filter 1025 before continuing to a check valve 1035. An accumulator assembly 1040 is provided as well as an exemplary pressure gauge 1045 and release connector. From the accumulator assembly 1040, the hydraulic fluid then flows into the tower as the return line 1005.

Figure 11:
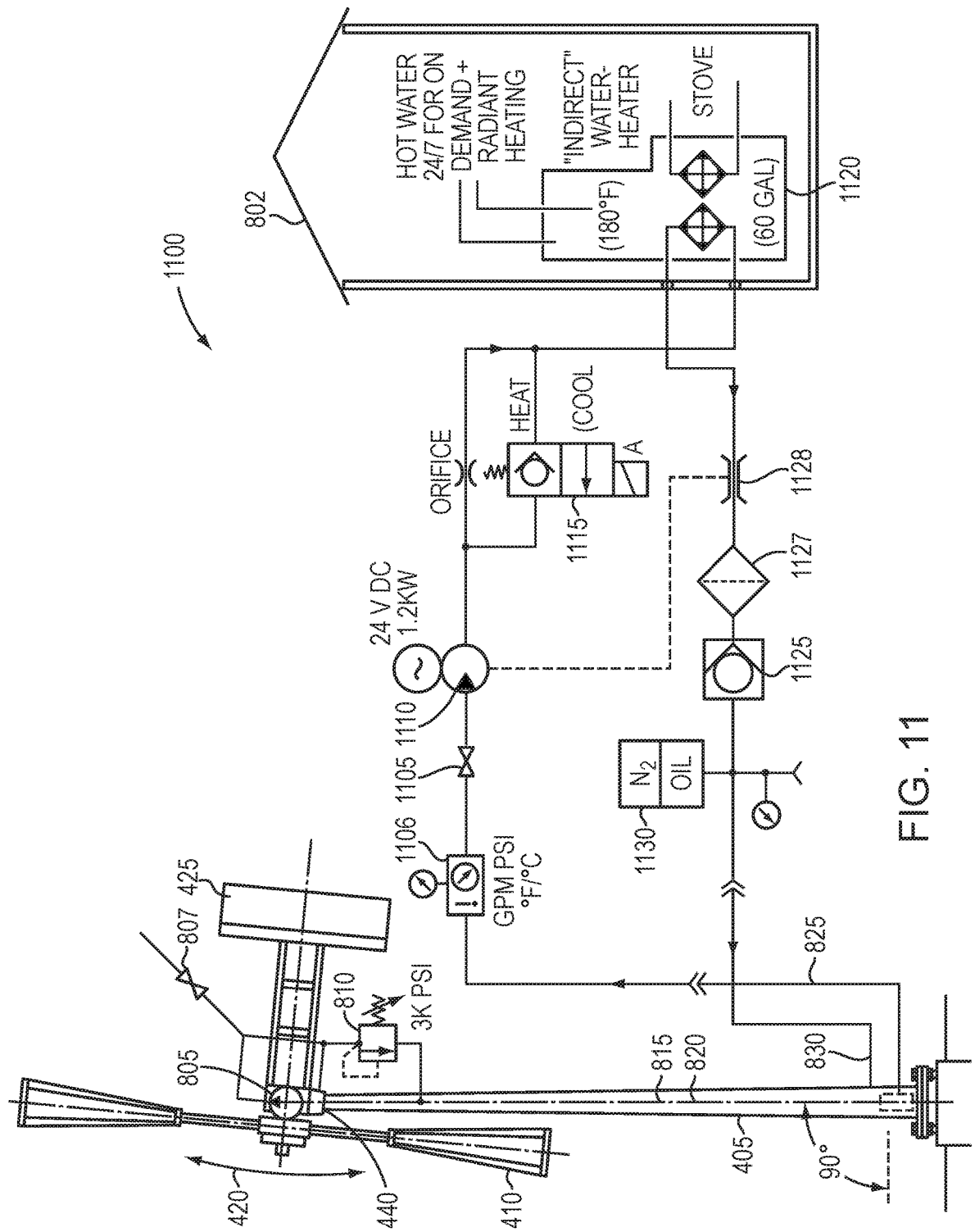
FIG. 11 is a diagram of an exemplary windmill system in accordance with an illustrative embodiment of the present invention.

FIG. 11 is an exemplary schematic diagram of a system 1100 for heating and electrical supply in accordance with an illustrative embodiment of the present invention. Similar to the previous figures, an exemplary windmill comprising a plurality of blades 410 with a nose dish 420. The windmill is operatively mounted to a yawl assembly 440 that enables the windmill to turn in the direction of the wind. Exiting the windmill is an exemplary pressured line 825 that flows to an exemplary flow meter 1106 that may, in accordance with illustrative embodiments of the present invention, have a flow/temperature gauge. From the flow meter, the hydraulic fluid then continues through a shut off to an exemplary alternator 1110 that generates DC voltage. Illustratively, the alternator 1110 generates 24 V DC at approximately 1.2 kW. However, it should be noted that in alternative embodiments of the present invention the alternator 1110 may be of differing sizes and/or configurations. As such, the description of the alternator 1110 being of a particular size and/or capacity should be taken as exemplary only. Pressure then flows through an orifice 1129 as well as into a temperature controlled valve assembly 1115. After exiting the temperature control valve assembly 1115, the flow continues into an indirect water heater 1120. The indirect water heater 1120 illustratively provides hot water for on-demand and radiant heating to a residence 802. In accordance with alternative embodiments of the present invention, additional heat may be provided to the indirect water heater via a stove. In alternative embodiments this heated provided by other sources including, for example electricity, natural gas, oil, solar, etc. As such, description of a type of second heating source should be taken as exemplary only. Further, in accordance with alternative embodiments of the present invention, the need for a second heating source within the indirect water heater should be taken as exemplary only.

Exiting the indirect water heater 1120, the flow then continues to a venturi valve 1128 before entering a filter 1127 and then a check valve 1125. After exiting the check valve 1125, fluid may be stored in an accumulator 1130 prior to reentering the return line 830 into tower 405.

Figure 12:
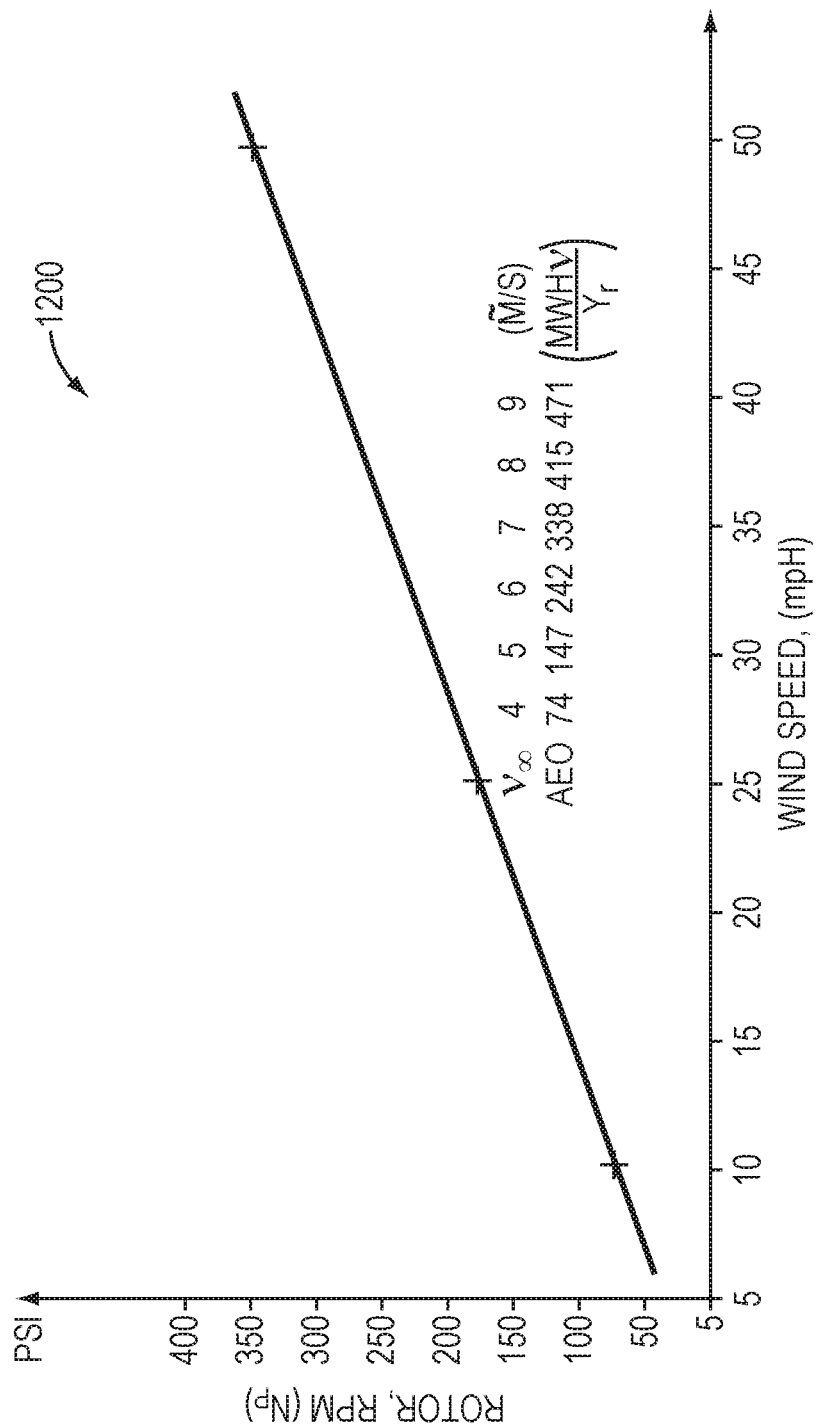
FIG. 12 is a diagram illustrating wind speed versus rotor revolutions per minute (RPM) in accordance with an illustrative embodiment of the present invention.

FIG. 12 is an exemplary graph 1200 illustrating since speed versus rotor speed. Illustratively, the wind speed is shown in gradients of miles per hour, whereas the motor speed is given in revolutions per minute (RPM). The use of an orifice enables the linear relation as the pressure drops as the square of the velocity as described further below.

Figure 13:
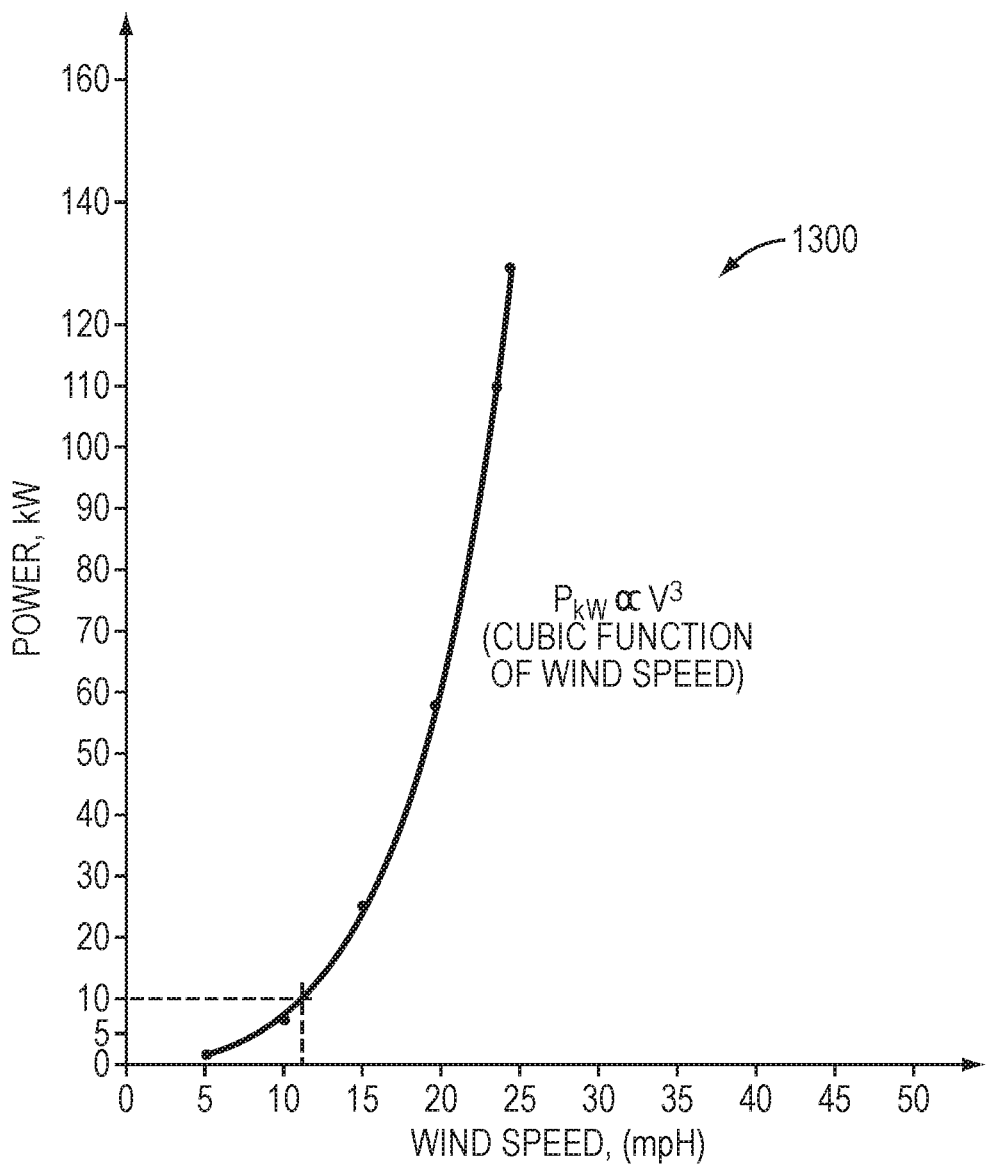
FIG. 13 is a diagram illustrating wind speed versus power generated in accordance with an illustrative embodiment of the present invention.

FIG. 13 is an exemplary chart 1300 illustrating speed versus power generated utilizing an exemplary windmill in accordance with an illustrative embodiment of the present invention. The x-axis is denoted in wind speed in miles per hour. The y-axis is shown in power generated in kilowatts. As can be seen, the power generated is a cubic function of speed.

Figure 14:
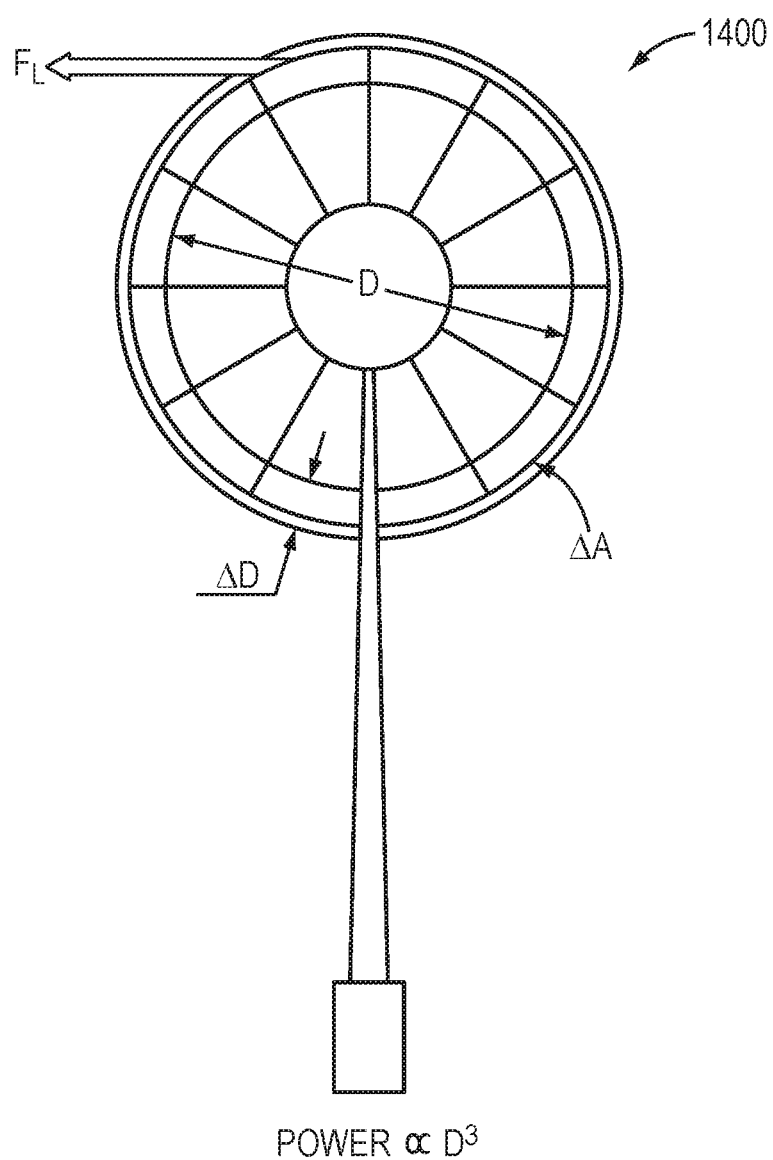
FIG. 14 is an exemplary diagram showing that the power harvested from the wind is proportional to the diameter cubed of the wind turbine in accordance with an illustrative embodiment of the present invention.

FIG. 14 is a diagram illustrating the ratio of power to the diameter of the wind turbine in accordance with an illustrative embodiment of the present invention. Based on fundamental geometry, it $\Delta D$ (an increase in the diameter) is added to D (diameter of the wind turbine), there is an associated increase in surface area ($\Delta A$) which is proportional to the lift force FL. This increases as $D^2$ and the energy that may be harvested is proportional to this are times the torque arm (D+$\Delta D$), i.e., proportional to $D^3$.

Figure 15:
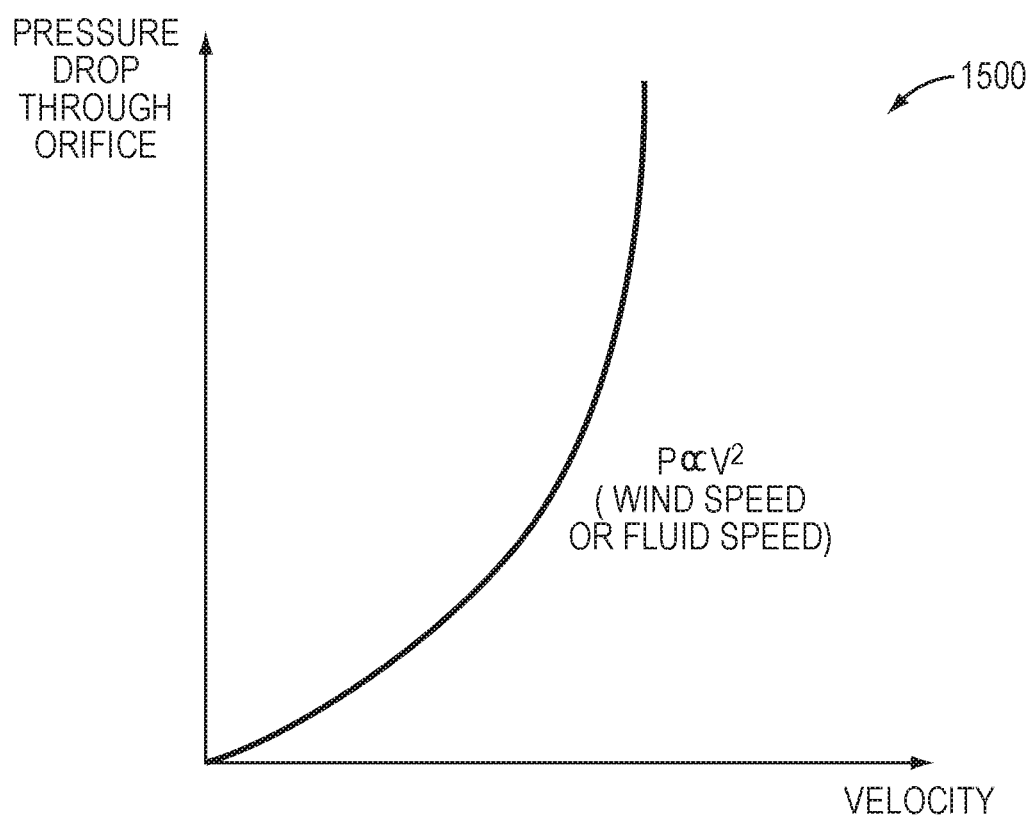
FIG. 15 is a chart showing that the pressure drop through an orifice is the square of the velocity of the fluid in accordance with an illustrative embodiment of the present invention.

FIG. 15 is an exemplary chart 1500 illustrating pressure drop through the orifice in relation to the velocity of the fluid. As shown in chart 1500, the pressure drops at the square of the velocity. This pressure drop is proportional to the velocity squared and aids in maintaining the speed of the blade assembly.

The above description has been written in terms of various exemplary embodiments. Therefore, it is intended that all matter contained in the above description or shown in the accompanying drawings shall be interpreted as illustrative and not in a limiting sense.

What is claimed is:

1. A system comprising:
a wind turbine having a plurality of blades connected to a central rotor, each of the plurality of blades partially overlaps another one of the plurality of blades, the overlapping of the plurality of blades causing lift forces to be captured by the wind turbine, wherein the wind turbine operates at a tip speed ratio of approximately three or less; and
a hydraulic pump directly operated by the wind turbine, the hydraulic pump configured to circulate hydraulic fluid within a closed circuit pressurized line, attached to a pressurized chamber, that feeds through an adjustable orifice, wherein a speed of the wind turbine is controlled, across all wind speeds above approximately five miles per hour after the wind turbine starts up, solely by the adjustable orifice by limiting pressure of the hydraulic flow through the adjustable orifice, the hydraulic fluid then flowing into one or more power devices external to the wind turbine.

2. The system of claim 1 wherein each of the plurality of blades has a substantially square wing tip.

3. The system of claim 1 wherein each of the plurality of blades has a Hoerner wing tip that increases an effective length of each blade.

4. The system of claim 1 wherein one of the one or more power devices is a generator.

5. The system of claim 1 wherein one of the one or more power devices is a heat exchanger.

6. The system of claim 1 wherein one of the one or more power devices is an indirect water heater.

7. The system of claim 1 wherein the wind turbine further comprises a nose cone.

8. The system of claim 1 wherein the plurality of blades is 12 blades.

9. A system comprising:
a wind turbine having a plurality of blades connected to a central rotor, each of the plurality of blades partially overlapping another one of the plurality of blades, to cause lift forces to be captured by the wind turbine; and
hydraulic pump directly operated by the wind turbine, the hydraulic pump circulating hydraulic fluid a within a closed circuit pressurized line, attached to a pressurized chamber, that feeds through an adjustable orifice, wherein a speed of the wind turbine is controlled, across all wind speeds above approximately five miles per hour after the wind turbine starts up, solely by the adjustable orifice by limiting pressure of the hydraulic flow through the adjustable orifice wherein pressure of the hydraulic flow through the adjustable orifice being proportional to a square of fluid flow velocity which is linearly proportional to wind speed, the hydraulic fluid in the pressurized line powering one or more power devices external to the wind turbine.

10. A system comprising:
a wind turbine having a plurality of blades connected to a central rotor, each of the plurality of blades having a center offset in an alternating pattern, each of the plurality of blades partially overlapping another one of the plurality of blades, the overlapping of the plurality of blades causing lift forces to be captured by the wind turbine, wherein the wind turbine operates at a tip speed ratio of approximately three or less; and
a hydraulic control system configured to transfer heat energy from a hydraulic fluid to a building, the hydraulic control system including a hydraulic pump directly operated by the wind turbine, the hydraulic pump configured to circulate hydraulic fluid within a closed circuit a pressurized line external to the wind turbine that feeds through an adjustable orifice, wherein a speed of the wind turbine is controlled, across all wind speeds above approximately five miles per hour after the wind turbine starts up, solely by the adjustable orifice by limiting pressure of the hydraulic flow through the adjustable orifice, the hydraulic fluid then flowing through the pressurized line external to the wind turbine into one or more power devices associated with the building.

\* \* \* \* \*

UNITED STATES PATENT AND TRADEMARK OFFICE
CERTIFICATE OF CORRECTION

Page 1 of 1

PATENT NO. : 11,384,734 B1
APPLICATION NO. : 15/482313
DATED : July 12, 2022
INVENTOR(S) : Orville J. Birkestrand It is certified that error appears in the above-identified patent and that said Letters Patent is hereby corrected as shown below:

In the Claims

Column 11, Line 10 reads:
"hydraulic pump circulating hydraulic fluid a within a"
Should read:
--hydraulic pump circulating hydraulic fluid within a--

Signed and Sealed this
Tenth Day of June, 2025

Coke Morgan Stewart
*Acting Director of the United States Patent and Trademark Office*